April 18, 1967  L. H. PERRY  3,314,695
FLUID JOINT AND SEAL ASSEMBLY THEREFOR
Filed Oct. 23, 1963
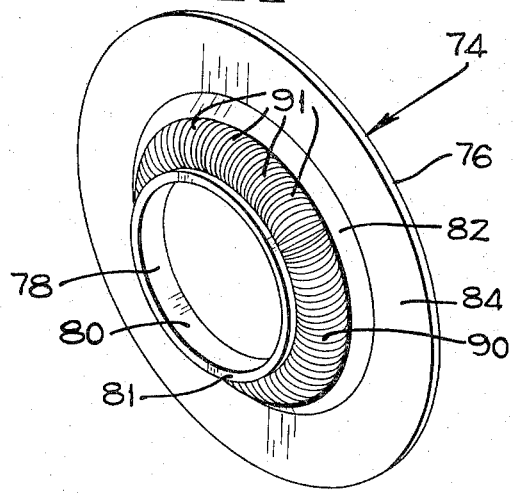
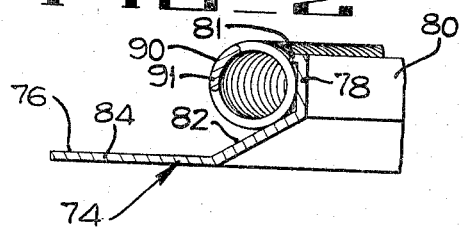
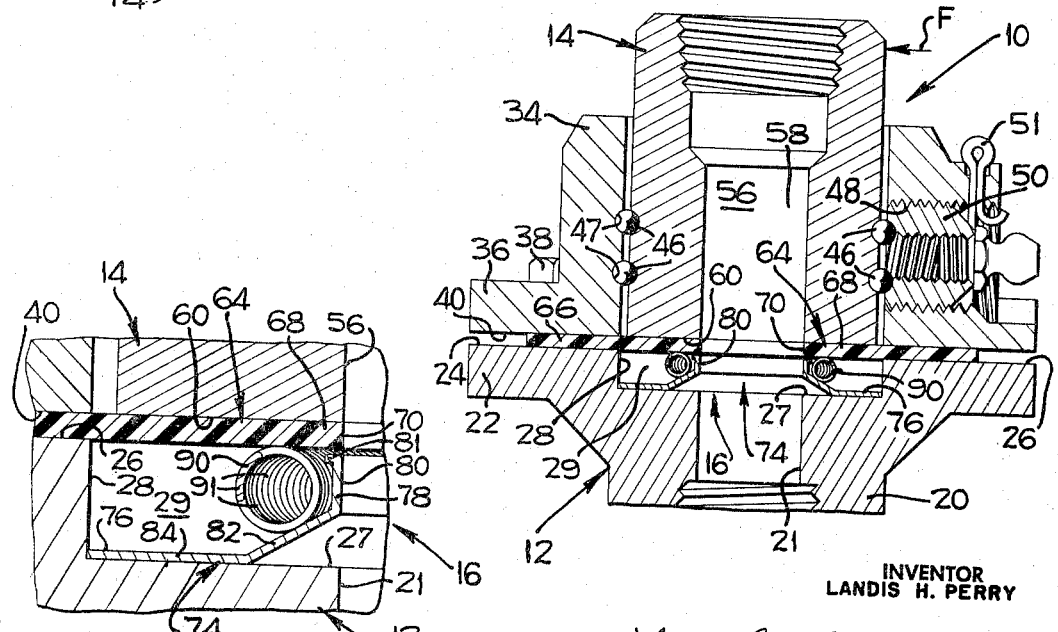
INVENTOR
LANDIS H. PERRY
BY Hans G. Hoffmeister
ATTORNEY

United States Patent Office 3,314,695
Patented Apr. 18, 1967

3,314,695
FLUID JOINT AND SEAL ASSEMBLY THEREFOR
Landis H. Perry, Newport Beach, Calif., assignor to FMC Corporation, San Jose, Calif., a corporation of Delaware
Filed Oct. 23, 1963, Ser. No. 318,310
6 Claims. (Cl. 285—95)

The present invention pertains to a fluid joint and seal assembly therefor and more particularly to a seal and seal energizer which are particularly useful in a swivel joint.

The seal assembly of the present invention is especially adapted for use in a swivel joint to provide a dynamic seal against the end face of the inner tubular joint member. Such swivel joints are subject to a diversity of operating conditions and therefore require a seal assembly having characteristics suited to the conditions. These swivel joints may be simultaneously subjected to temperature extremes, chemically reactive fluids, and to high moment loads.

As is known, a seal may have characteristics suited to one operating condition and entirely unsuited to another operating condition. This is the situation with conventional seals of elastomeric material. When an elastomeric seal is held in fluid-tight engagement with the end face of a rotating joint member and said member is subjected to moment loads, the seal resiliently compresses and expands to accommodate transverse movement of the joint member while maintaining fluid-tight integrity over the entire end face. However, the temperature and the chemical characteristics of the fluid being handled may exceed the resistance of the elastomer whereby the seal rapidly breaks down, deteriorates, and fluid-tight integrity is lost.

On the other hand, if a non-elastomeric seal, urged against the rotating end face by a spring-pressed plate, is used, in order to take advantage of its resistance to temperature extremes and chemical inactivity, fluid-tight integrity is lost when moment loads shift the end face out of its normally radial plane. That is, a rigid pressure plate pressing against a rigid or semi-rigid seal is unable to accommodate the usual amount of transverse movement of a joint member when the same is subjected to moment loads.

The seal assembly of the present invention uses a rigid or semirigid non-elastomeric seal capable of withstanding temperature extremes and resisting chemical deterioration and an energizer which maintains the seal in fluid-tight engagement with the rotating end face of the swivel joint member notwithstanding application of moment loads which shift the end face out of its normally radial plane, and other operating conditions which tend to develop leakage paths at the seal.

An object of the present invention is to provide a seal assembly for a swivel joint which assembly is resistant to temperature extremes and chemical deterioration and which maintains fluid-tight integrity when the swivel joint is subjected to moment loads.

Another object is to provide a non-elastomeric seal and an energizer therefor that accommodates movement of the seal out of a predetermined plane while maintaining the seal in a sealing position.

Another object is to provide a seal assembly which utilizes a non-elastomeric seal that closely approaches an elastomeric seal in sealing effectiveness.

Another object is to provide a seal assembly including a relatively rigid seal and an energizer which converts the radial inwardly directed force of a diametrically resiliently expandable member into a thrust force applied circumferentially against the seal and at an angle to said radial force.

Another object is to provide a seal energizer of integrated or unit-handled construction.

Another object is to thrust an annular non-elastomeric seal against a rotatable end face of a swivel joint by a resiliently yieldable force which is substantially uniformly applied over almost the entire circumference of the seal.

Another object is to provide a seal and energizer as in the preceding paragraph in which the magnitude of the force exerted by the energizer on the seal is adjustable.

Another object is to provide a seal and energizer of the type described which is reliable, durable, simple to assemble and replace, and economical.

These objects, together with other objects and advantages, will become apparent upon reference to the following description and accompanying drawings, in which:

FIG. 1 is a perspective of a seal energizer embodying the present invention.

FIG. 2 is an enlarged, fragmentary radial section of the energizer shown in FIG. 1.

FIG. 3 is a fragmentary diametric section of a swivel joint including a non-elastomeric seal and the energizer of FIG. 1 although at a scale reduced from that of FIGS. 1 and 2.

FIG. 4 is an enlarged portion of FIG. 3 illustrating in greater detail the position of the energizer when in use.

Referring more particularly to the drawings, a swivel joint 10 (FIG. 3), of the type disclosed in the Faccou Patent No. 2,927,805, includes an outer tubular joint member 12, an inner tubular joint member 14 rotatable within the outer joint member, and a seal assembly 16 embodying the principles of the present invention between the inner and outer joint members.

The outer member 12 of the swivel joint 10 includes a coupling section 20 having an axial bore 21 and a radial end flange 22. This end flange has an annular end face 24 surrounding the bore and including an outer segment 26, an inner segment 27, and an axial shoulder 28 joining the inner and outer segments. Furthermore, the inner segment and shoulder define a recess 29 in the coupling section of the joint member.

The outer joint member 12 also includes a socket section 34 having a radial end flange 36 connected by bolts, as 38, to the end flange 22 of the coupling section 20, with its end face 40 confronting the outer segment 26 of the end face 24.

The inner joint member 14 is rotatably mounted within the socket section 34 by ball bearings 46 which are positioned in their raceways 47 through an access opening 48 in the socket section. A plug 50 is threaded in the access opening and held in place by a cotter pin 51.

The inner joint member 14 has an axial bore 56 that is coaxial with the bore 21 of the coupling section 20 when the joint members 12 and 14 are interconnected as described. These two bores thereby provide a common flow passage 58 through the swivel joint. The inner joint member has an annular sealing end face 60 surrounding the flow passage and in axially spaced relation to the inner segment 27 of the end face 24 on the coupling section 20. This sealing end face is normally in a common radial plane with the end face 40 of the flange 36. It is believed understood that this sealing end face is also normally parallel to the inner segment 27.

An annular sealing disc 64 is positioned between the end flange 22 of the coupling section 20 and the end flange 36 and sealing end face 60. This sealing disc has an outer radial portion 66 compressively held by the bolts, as 38, between the outer segment 26 of the end face 24 and the end face 40. The sealing disc also has an inner radial portion 68 overlying the sealing end face 60 of the inner joint member 14 so that this inner radial portion also is in axially spaced relation to the inner segment 27 of the end face 24. The sealing disc has a bore 70 which is of the same diameter as the flow passage 58 and is in circumscribing relation thereto.

It is significant that the sealing disc is made of a material which is capable of withstanding temperature extremes and resisting chemical deterioration. In other words, the disc material is relatively chemically inactive. Therefore, it is preferable to make the disc of metal; asbestos; fluorocarbons such as Tedlar, Teflon and Kel-F; or the like. Since elastomeric materials, that is rubber or rubber-like materials, are incapable of withstanding extremes of temperatures and are subject to deterioration by certain chemicals, the sealing disc is non-elastomeric. Thus, the material of the sealing disc may be characterized as rigid or semirigid as compared with an elastomer. That is, as used herein the term rigid is intended to express a lack of resilient compressibility and expandability, the latter of course characterizing an elastomer.

A significant feature of the present invention is an energizer 74 for the non-elastomeric sealing disc 64, the energizer and the disc constituting the seal assembly 16. This energizer includes a relatively rigid annular retainer 76 having a tubular wall 78 providing a bore 80 whose diameter is equal to the diameter of the flow passage 58, a radial end lip or flange 81 projecting outward from the tubular wall, a frusto-conical camming wall 82 divergently extended from the tubular wall in a direction away from the lip, and a flat radial mounting wall 84 projecting outward from the camming wall. The mounting wall has a maximum diameter which is substantially the same as the diameter of the recess 29.

The energizer 74 also includes an endless, diametrically elastic garter spring or energizing member 90 including a plurality of closely spaced coils 91 each having a diameter greater than the length of the tubular wall 78 of the retainer 76. The spring is of course flexible in that several of the coils can be moved out of axial alignment with the remainder of the coils. Furthermore, the minimum diameter of the garter spring when the same is in an unstressed or relaxed condition is less than the maximum diameter of the tubular wall. The garter spring is mounted on the retainer in encircling relation to the tubular wall. Because of the described diametrical relationship between the spring and this wall, the spring is slightly diametrically expanded when mounted on the retainer. Furthermore, as illustrated in FIG. 2, because of the relationship between the diameter of each of the coils and the length of the tubular wall, the spring projects endward of the lip and is in tangential engagement with the camming wall, the tubular wall, and the lip. It will be understood that the lip prevents movement of the spring endwardly off the retainer. Instead of providing a right angularly related lip and wall, the lip and wall may be concavely contoured to fit the spring.

In use of the subject energizer 74, the same is positioned within the recess 29 of the swivel joint 10 with the mounting wall 84 in flush engagement with the inner segment 27, and with the camming wall 82 and the tubular wall 78 projecting toward the sealing disc 64. As best shown in FIG. 4, the lip 81 is spaced slightly from the sealing disc 64. Engagement of the endwardly projecting portion of the garter spring 90 with the sealing disc forces the spring outward on the camming wall 82 thereby diametrically expanding the spring and increasing its radially inward constrictive force. This constrictive force has a component, hereinafter referred to as a thrust force, which is exerted, through the spring, against the sealing disc at an angle to the radial constricting force thereby urging the sealing disc against the sealing end face 60. Since the constrictive force is uniformly distributed around the tubular wall, the thrust force is likewise uniformly applied circumferentially on the sealing disc. In other words, the thrust force is not applied at three or four spaced points about the sealing disc but, instead, is applied at each point on the sealing disc where a coil 91 contacts the disc. The magnitude of the thrust force depends on the angle between the mounting wall 84 and the camming wall 82 so that the magnitude of this thrust force can be adjusted by initially adjusting the angle of the camming wall.

In operation, as the inner joint member 14 rotates within the outer joint member 12, a static seal is established between the flanges 22 and 36 by the outer portion 66 of the sealing disc 64. Furthermore, a dynamic seal is established between the sealing end face 60 and the sealing disc 64 by the energizer 74.

A significant advantage of the subject energizer 74 is its ability to maintain fluid-tight integrity of the dynamic seal notwithstanding irregularities between the sealing end face 60 and the sealing disc 64, wear on this end face and sealing disc, axial movement between the sealing end face and the inner segment 27 of the end face 24, and moment loads represented by force F on one of the joint members, as 14, with respect to the other joint member, as 12. In the case of moment loads, there is a tendency for the sealing end face to shift slightly out of parallel relation with the inner segment 27; it should be noted that there is sufficient clearance in the joint and sufficient flexibility in the disc to permit such movement. Under any of the operating conditions described in the preceding two sentences, the spring 90 moves either inward or outward on the camming wall 82 and continuously applies thrust force against the sealing disc in order to maintain fluid-tight integrity between the sealing end face and the sealing disc. For example, under moment load F which causes slight non-parallelism between the sealing end face and the inner segment, the coils 91 on approximately one-half of the spring move outward along the camming wall whereas the remaining coils move inward on the camming wall so that the axis of the spring remains generally coaxial with the axis of the inner joint member; it is believed evident that this shifting of the spring constantly forces the sealing disc against the sealing end face and does not allow fluid leakage paths to develop therebetween. Again it is to be noted that although the disc does not have the resilient compressibility and expandability to accommodate for and close such paths by itself, it is sufficiently flexible to yield somewhat under pressure of the spring so that the latter holds it firmly against the sealing face.

From the foregoing, it will be evident that a seal assembly for a swivel joint has been provided which utilizes a seal capable of withstanding temperature extremes and resisting chemical deterioration and an energizer which maintains fluid-tight integrity of the seal while accommodating moment loads on the joint, wear of the sealing surfaces, irregularities in the sealing surfaces, and limited axial movement of the joint members. Because of the resilient thrust force developed and applied circumferentially to the sealing disc by the retainer, the subject seal assembly approaches an elastomeric seal in effectiveness.

Although a preferred embodiment of the present invention has been shown and described, it will be understood that various changes and modifications may be made in the details thereof without departing from the spirit and the scope of the appended claims.

Having described the subject invention, what is claimed to be new and desired to be secured by Letters Patent is:

1. In a swivel joint including coaxial first and second tubular members providing a common fluid passage therethrough, said members having spaced radial annular planar end faces in at least partially confronting relation to each other, the end face on said second member including an outer segment and an inner segment spaced axially farther from said first member's end face than said outer segment, an annular seal of non-elastomeric material lying against said first end face and said outer segment of said second end face, means for urging said seal into sealing relation with said outer segment, and means for mounting said first member for rotation of said end face against said seal and for limited shifting of the axis of said first member into angular relation to the axis of said second member whereby said end face is moved out of a radial plane, a seal energizer comprising a rigid annular retainer positioned between said seal and the inner segment of said second end face in surrounding relation to said fluid passage, said retainer including a frusto-conical camming wall convergently extending from said inner segment toward said seal and a tubular wall extending from said camming wall toward said seal around said fluid passage, and a garter spring circumscribing said tubular wall and being in tangential engagement with said camming wall and said seal and being diametrically tensioned by such engagement whereby it resiliently applies substantially uniform force circumferentially on said seal which force urges said seal against said first end face during said rotation and shifting of said first member with respect to said second member, the maximum diameter of the tubular wall being greater than the inside diameter of the spring in its diametrically relaxed condition.

2. An energizer for a seal comprising a rigid annular retainer having a tubular wall, a frusto-conical camming wall rigid with and divergently projecting away from said tubular wall, and a radial lip rigid with and projecting from said tubular wall in axially spaced relation to said camming wall, and an endless annular diametrically elastic, flexible member circumscribing said tubular wall between said lip and said camming wall and having a cross-sectional dimension measured axially of said tubular wall greater than the minimum axial distance between said camming wall and the end face of said lip such that when the energizer is assembled the said flexible member extends axially beyond the surface of said lip, said flexible member being movable axially of said retainer between a relatively relaxed condition abutting said lip and a diametrically expanded condition spaced from said lip and circumferentially engaging said camming wall, said flexible member projecting endwardly from said lip in both of said relatively relaxed and expanded conditions.

3. The energizer of claim 2 wherein said flexible member is a garter spring.

4. The energizer of claim 2 wherein said lip has an end face, and wherein said flexible member has a round cross-section, said member tangentially engaging said lip, said tubular wall and said camming wall in said relatively relaxed condition.

5. In a swivel joint including coaxial first and second tubular members providing a common fluid passage therethrough, said members having spaced radial annular planar end faces in at least partially confronting relation to each other, the end face on said second member including an outer segment and an inner segment spaced axially farther from said first member's end face than said outer segment, an annular seal of non-elastomeric material lying against said first end face and said outer segment of said second end face, means for urging said seal into sealing relation with said outer segment, and means for mounting said first member for rotation of said end face against said seal and for limited shifting of the axis of said first member into angular relation to the axis of said second member whereby said end face is moved out of a radial plane, a seal energizer comprising a rigid annular retainer positioned between said seal and the inner segment of said second end face in surrounding relation to said fluid passage, said retainer including a tubular wall, a frusto-conical camming wall divergently projecting away from said tubular wall, and a radial lip projecting from said tubular wall in axially spaced relation to said camming wall; and a garter spring circumscribing said tubular wall and being movable axially of said retainer between a relatively relaxed condition abutting said lip and a diametrically expanded condition in tangential engagement with said camming wall and said seal whereby the spring resiliently applies substantially uniform force circumferentially on said seal which force urges said seal against said first end face during said rotation and shifting of said first member with respect to said second member, said lip having an end face, said garter spring having a cross-sectional dimension measured axially of said tubular wall which is greater than the minimum axial distance between said camming wall and the end face of the lip, said spring tangentially engaging said lip, said tubular wall and said camming wall in said relatively relaxed condition.

6. In a swivel joint including coaxial first and second tubular members providing a common fluid passage therethrough, said members having spaced radial annular planar end faces in at least partially confronting relation to each other, the end face on said second member including an outer segment and an inner segment spaced axially farther from said first member's end face than said outer segment, an annular seal of non-elastomeric material lying against said first end face and said outer segment of said second end face, means for urging said seal into sealing relation with said outer segment, and means for mounting said first member for rotation of said end face against said seal and for limited shifting of the axis of said first member into angular relation to the axis of said second member whereby said end face is moved out of a radial plane, a seal energizer comprising a rigid annular retainer positioned between said seal and the inner segment of said second end face in surrounding relation to said fluid passage, said retainer including a camming wall convergently extending from said inner segment toward said seal and a tubular wall extending from said camming wall toward said seal around said fluid passage, and a garter spring circumscribing said tubular wall and being in tangential engagement with said camming wall and said seal and being diametrically tensioned by such engagement whereby it resiliently applies substantially uniform force circumferentially on said seal which force urges said seal against said first end face during said rotation and shifting of said first member with respect to said second member, the maximum diameter of the tubular wall being greater than the inside diameter of the spring in its diametrically relaxed conditon.

References Cited by the Examiner
UNITED STATES PATENTS

| | | | |
|---|---|---|---|
| 2,202,908 | 9/1940 | Hubbard | 277—48 |
| 2,462,067 | 2/1949 | Buchendale | 277—84 X |
| 2,472,257 | 6/1949 | Matter | 277—84 |
| 2,877,029 | 3/1959 | Peguet et al. | 277—84 X |
| 2,927,805 | 3/1960 | Faccou | 285—363 X |
| 3,061,320 | 10/1962 | Haensch | 277—84 X |
| 3,069,174 | 12/1962 | Skinner | 277—48 |
| 3,136,568 | 6/1964 | Ragsdale | 284—276 X |

FOREIGN PATENTS

| | | |
|---|---|---|
| 1,103,190 | 5/1955 | France. |
| 719,222 | 12/1954 | Great Britain. |

CARL W. TOMLIN, Primary Examiner.

THOMAS F. CALLAGHAN, Examiner.